United States Patent Office 2,749,084
Patented June 5, 1956

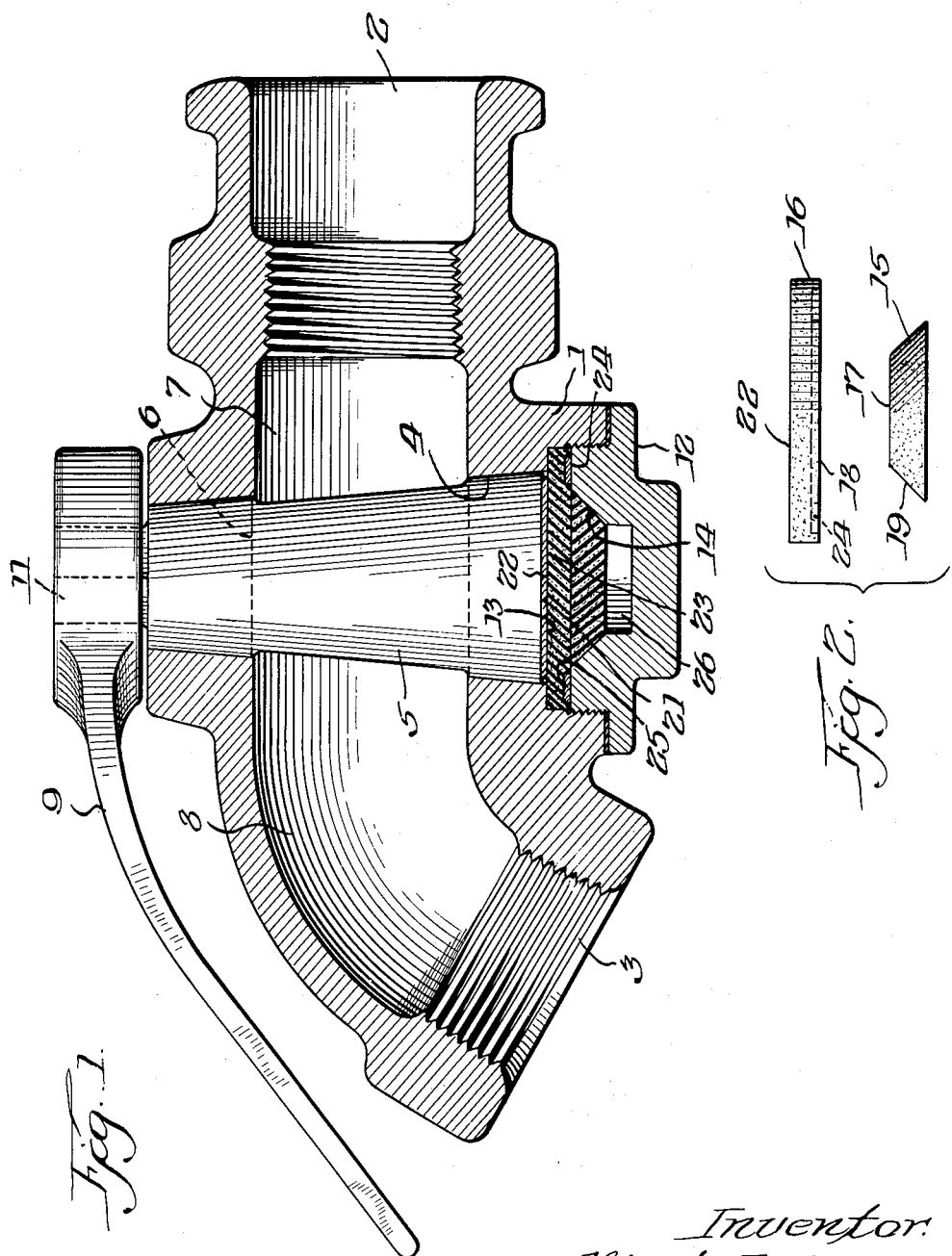

2,749,084

AIR BRAKE TRAIN LINE COCKS

Albert J. Townsend, Wilmette, Ill., assignor to Crane Co., Chicago, Ill., a corporation of Illinois Application February 6, 1953, Serial No. 335,577

5 Claims. (Cl. 251—183)

This invention relates broadly to valves. More specifically, it pertains to a type of valve known to those skilled in the art as air brake train line cocks.

At the outset, in order to obtain a better appreciation of the background of this inventive concept, it should be understood past valve failures or troubles have been relatively numerous and very serious. For example, in the problem of moisture condensing within an air supply line, such as that used for air brakes or railroad trains, it is known that in the valve chamber or cavity below the valve plug of the ordinary inverted plug type of valve there is such objectionable accumulation, which results in damage by freezing and corrosion in said lower cavity. This gradually weakens the compression of the spring and frequently leads to the unseating of the plug or rotatable closure member. Further, the repeated reversals of line flow have a tendency to force any water and line foreign matter onto the seating or bearing surfaces respectively of the valve casing and closure member to accelerate failure in the performance of the valve. It also may cause accidental closing under conditions of line vibration leading to an air shortage on cars beyond, leaving them without brakes. It may also cause a condition to result in which the valve, if at all operable, can only be closed (or opened) with the exercise of relatively tremendous effort.

Therefore, one of the more important objects of this invention is to provide for a plug valve design which eliminates the use of the objectionable coil spring immediately below the tapered rotatable closure member and substitutes instead a resilient member of rubber or a rubber-like block form so designed and arranged as to preferably fill the space immediately beneath the plug or closure member. Further, the novel resilient member of this invention keeps the water out of the lower valve chamber and thereby prevents the corrosion or rusting or both as previously referred to.

Another object is to provide a valve construction in which the initial compression of the resilient block member within a valve chamber holds the valve plug in seated position with a substantially constant force.

Other objects and advantages of the invention will follow upon proceeding with a reading of the specification and accompanied by the drawings, in which Fig. 1 is a sectional assembly view of a valve embodying my invention.

Fig. 2 is an exterior exploded view of the structure forming the novel compression member employed.

Similar reference numerals refer to similar parts throughout the several views.

Referring now to Fig. 1, a conventional plug valve body 1 is shown having the usual inlet 2 and the outlet leading therefrom at 3 for connecting to air conveying pipelines not shown. The central portion of the valve body, a central chamber 4 of frusto-conical form is suitably machined to form a bearing to receive a frusto-conical plug rotatable closure member designated 5. The latter member has the through port 6 extending therethrough communicating as shown in the open position of the valve (indicated) with the chambers 7 and 8 respectively at the upstream and downstream side of the valve body.

At the upper or smaller end portion of the valve plug, the usual actuating means, such as the wrench 9, is mounted upon the polygonal head 11 of the plug 5. At the lower portion of the valve casing 4 between the threaded cap 12 and the lowermost end portion of the plug as referred to at 13 a chamber is formed. The interior and recessed portion of the cap is preferably of frusto-conical or annularly tapered form, as indicated at 14. Further, the cap chamber is preferably so proportioned that when the blocks 15 and 16 of resilient material (see Fig. 2) are received within the said chamber and the cap 12 has been pulled up to the shouldered position shown in Fig. 1, the combined resilient material is under a very high compression load. Of course, the members 15 and 16 may be made in one piece or they may be made in separate portions, as indicated in Fig. 2. However, it is particularly emphasized that when the resilient members 15 and 16 are combined and assembled within the valve chamber contact of the member 15 is made in abutting relation with the surface 17 bearing against the lower surface 18 of the cylindrical member 16. Therefore, it will be understood that the tapered annular portion referred to as 19 on the member 15 will be folded over and thus tend to cause the member 16 to be slightly under higher compression at its central area as the folded portion of member 15 bears against the annular surface 18 of the member 16 between the surface 13 of the plug and the upper surface 22 of the rubber washer 16. Primarily for the purpose of resisting wear, an interposed metal ring 21 is positioned below the plug 5 as indicated, and at 24 another metal ring is interposed to bear within the inner groove surface 25 of the resilient member 16.

The combined resilient members below the plug and within the retaining cap 12 fill preferably the entire chamber when the plug cap 12 is finally tightened in position in its final assembly, except for the chamber 26 which functions to receive any overflow so to speak of the member 15. The resilient material comprising the members 15 and 16 thus extends into the hollow portion of the retaining cap 12 and is of such cubical size and form that after the valve is assembled suitable compression is effectively exerted against the conical plug to hold it in desired seated position.

It will also be clear that the combined members 15 and 16 when compressed between the surfaces 13 and 14 will not only serve to hold the plug 5 in fluid sealing position with respect to forming a seat bearing with the casing 1 but the outer peripheral positions of surfaces 18 and 22 also serve as seals between the cap and casing so that any fluid condensing within the valve cannot escape into the lowermost chamber 26. In some cases, it may also be desirable to form the member 15 with a small depending central portion so as to substantially fill the chamber 26, thereby avoiding the possibility of substantial fluid deposits condensing therewithin. In extremely cold weather, this accumulation could interfere with valve operation and in many cases cause dangerous corrosion.

The particular shape of the members 15 and 16 may vary substantially from that illustrated, and the material may be any non-metallic, deformable and preferably resilient material. Therefore, the true spirit of this invention should be measured by the scope of the appended claims.

I claim:

1. The combination of a plug valve, a casing therefor, a rotary plug valve closure member of frusto-conical shape within said casing, the said casing having a central valve chamber, a hollow cap for the said chamber at the large end of said closure member, a deformable resilient material member within a lower portion of the said chamber substantially filling the same and having an outer annular portion serving as a fluid seal respectively between the plug, the casing and the cap, the said cap having a recessed portion defined in part by an annular tapering surface for bearing against and supporting a lower annularly folded peripheral corner portion of said resilient material member against said annular tapering surface.

2. The combination of a plug valve, a casing therefor, a rotary plug valve closure member of frusto-conical shape within a chamber of the said casing, the said casing having a lower end extension of the valve chamber at the large end of said closure member, a cap for the said lower end extension of the said chamber, a deformable resilient member with a depending frusto-conical portion within the said lower extension chamber substantially filling the same except for a lower recess within the said cap, the upper limits of said lower cap recess being defined by an outwardly tapering annular surface substantially supporting a turned up annular portion of the said resilient member, the said frusto-conical portion of said deformable resilient member being tapered in a direction opposite to that of the tapered annular surface of the chamber upon initial assembly of the said cap with the said casing.

3. The combination of a plug valve, a casing therefor, a rotary plug valve closure member of frusto-conical shape, the said casing having a valve chamber, a cap for the said chamber, a deformable resilient member within the said chamber substantially filling a larger end portion of the same beyond an end limit of the said closure member and having a flat gasket portion serving as a fluid seal respectively between the said closure member, the casing and the cap, an upper portion of the said resilient member forming said gasket, the lower portion thereof being of frusto-conical form and being foldably deformable peripherally by a recessed annularly tapered wall portion of said cap upon predetermined assembly of the cap with the casing in fluid sealing relation therewith.

4. The combination of a plug valve, a casing therefor, a rotary plug valve closure member of frusto-conical shape, the said casing having a central valve chamber for the said closure, a cap for a larger end portion of the said chamber with a frusto-conical surface defining one limit of the said chamber, a compressible resilient block of material with a frusto-conical portion reversely tapered within the said chamber substantially filling the larger end portion of the same and on an outer peripheral portion thereof serving as a fluid seal respectively between the plug, the casing and the said cap, upper and lower annular portions of the said resilient block being of unlike gradually enlarged cross-section in a direction towards the closure member, an upper annular cylindrical portion thereof forming said fluid seal.

5. The combination of a plug valve, a casing therefor, a rotary plug valve closure member of frusto-conical shape seated in said casing, the said casing having a lower frusto-conical valve chamber at the large end of said closure member, a threaded cap for the said chamber, a compressible resilient member within the said chamber substantially filling a larger end portion of the same beyond an end limit of the said closure member and serving as a seal respectively between the closure member, the casing and the treaded cap, the latter member having a recessed portion the upper end of which is enlarged and defined by an annular tapered surface complementary to said valve chamber and normally compressing and folding over said resilient member towards its central axis when the said cap is finally assembled with said casing, the said resilient member having a frusto-conical portion tapering in a direction opposite to that of the taper of the frusto-conical portion of the said valve chamber.

References Cited in the file of this patent
UNITED STATES PATENTS

| | | |
|---|---|---|
| 1,911,344 | Bard | May 30, 1933 |
| 2,123,655 | McDougal | July 12, 1938 |
| 2,571,925 | Mueller | Oct. 16, 1951 |